United States Patent [19]

Sheaffer

[11] Patent Number: 4,475,499
[45] Date of Patent: Oct. 9, 1984

[54] INLET TUNING OF CRANKCASE SUPERCHARGED FOUR CYCLE ENGINE

[75] Inventor: Benjamin L. Sheaffer, Oshkosh, Wis.

[73] Assignee: Brunswick Corporation, Skokie, Ill.

[21] Appl. No.: 452,206

[22] Filed: Dec. 22, 1982

[51] Int. Cl.³ .............................................. F02B 75/02
[52] U.S. Cl. ..................................... 123/317; 123/318
[58] Field of Search ................................ 123/317, 318

[56] References Cited

FOREIGN PATENT DOCUMENTS 133085 10/1919 United Kingdom ................. 123/317

Primary Examiner—Wendell E. Burns
Attorney, Agent, or Firm—Andrus, Sceales, Starke & Sawall

[57] ABSTRACT

A crankcase supercharged four cycle engine (10) includes an outside air inlet port (22) positioned so that upon each expansion stroke of the piston (11) a discrete pulsed charge of pressurized air is fed to the crankcase (15), and hence from the crankcase through a one-way valve (26) into surge tank (28). The surge tank chamber (29) is connected through a tuning pipe (31) to a manifold volume chamber (34) leading to the air intake (20) of the engine cylinder (12). The tuning pipe is designed with the correct length and volume to provide a resonant frequency which increases engine torque at low speed. The construction provides a closed loop connection (24) between the crankcase and engine cylinder which is subjected to air pressure pulses which are directly responsive to the frequency of reciprocation of the piston. A pressure multiplier effect is obtained within the loop to substantially increase the pressure of air ultimately fed to the cylinder.

4 Claims, 5 Drawing Figures

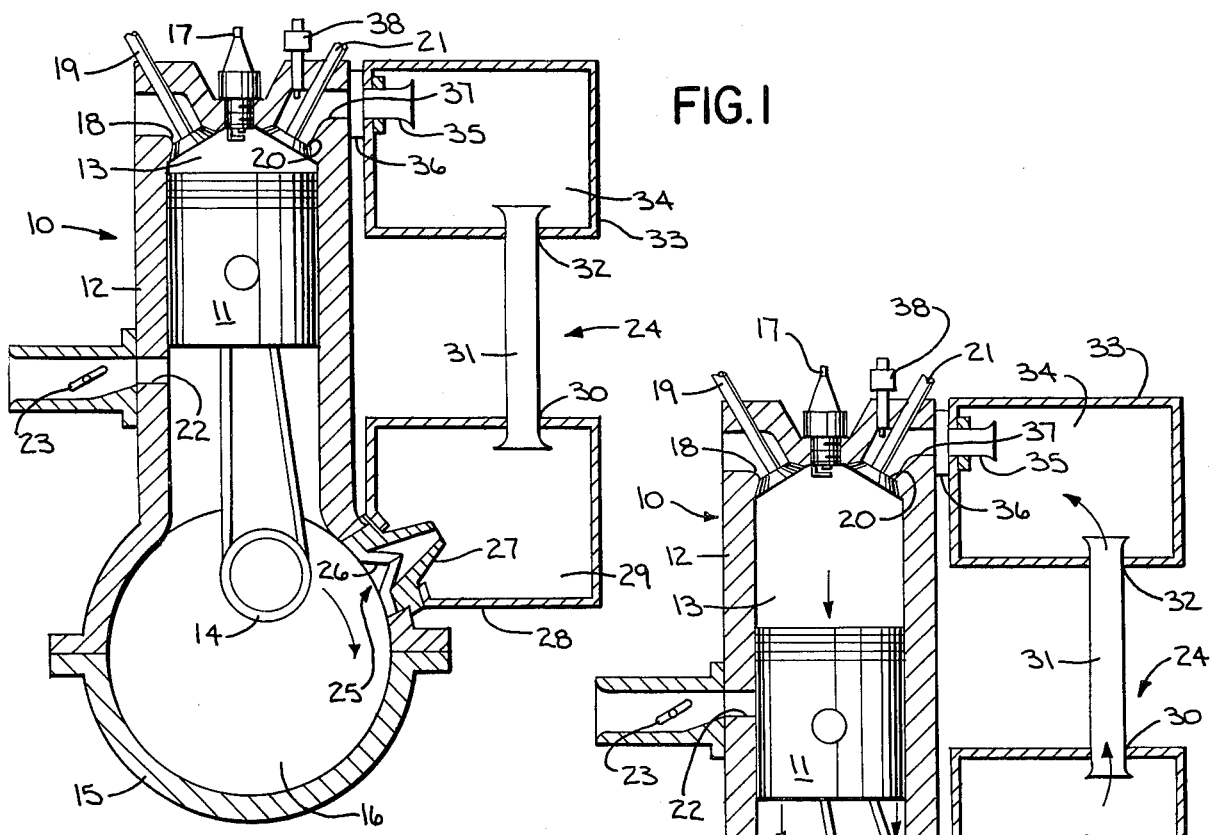
FIG. 1
FIG. 2
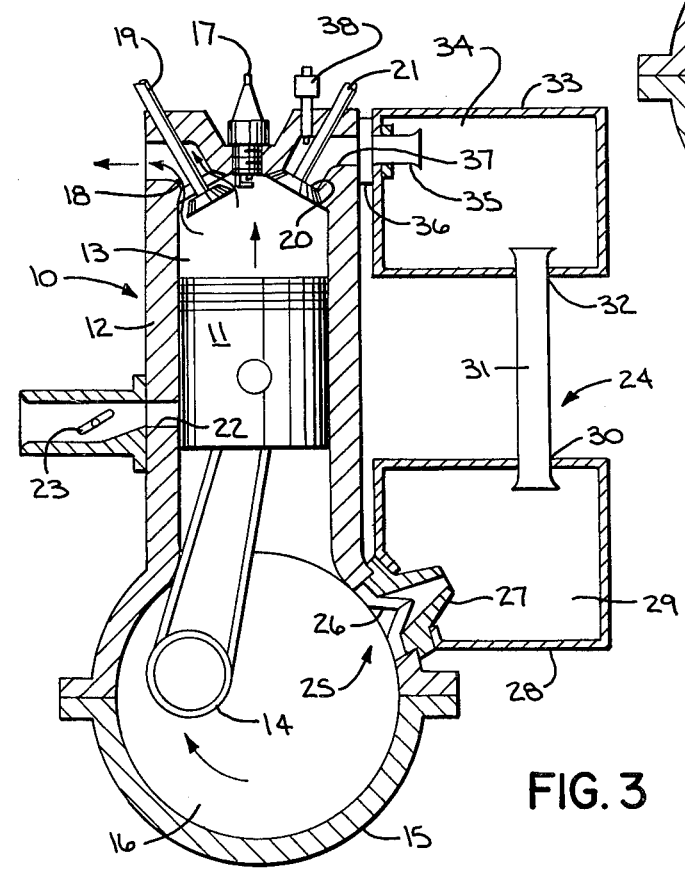
FIG. 3

INLET TUNING OF CRANKCASE SUPERCHARGED FOUR CYCLE ENGINE

CROSS REFERENCE TO RELATED APPLICATION

A portion of the apparatus and methods disclosed in this application are disclosed and/or claimed in the following concurrently filed application.

Ser. No. 452,153, filed Dec. 22, 1982 in the name of Benjamin L. Sheaffer and entitled "Crankcase Supercharged Four Cycle Engine With Jet Pump Assist".

1. Technical Field

The invention relates to a crankcase supercharged four cycle engine.

2. Background Art

Supercharging of internal combustion engines has frequently been used to help the fuel burn more completely and to make the engine produce more power. The supercharging usually operates by compressing the air fed into the cylinder or cylinders, as by charging the crankcase. See, for example, the article entitled "Webra T4 Four Cycle" commencing at Page 32 of the May, 1981 issue of "Model Airplane News".

In addition, some prior engines have utilized a passage connecting a crankcase outlet with an air inlet to the engine cylinder to provide the supercharging function. A one way valve, such as a reed valve, has been positioned at the crankcase outlet, and an inlet pot or surge tank has been disposed centrally within the passage, as disclosed in a Japanese article by Dr. Watanabe entitled "Improvement of Volumetric Efficiency of 4-Stroke Cycle Engine by Crankcase Supercharging".

Furthermore, atmosphere-connected jet pumps have been used in two cycle engines, to assist in providing fuel-free air to the cylinder chamber of the engine, as in the Henrikson U.S. Pat. No. 3,257,996.

Also, some turbocharged diesel engines are provided with a Helmholtz tuned induction system wherein low speed engine performance is enhanced by increasing the torque output. In this system, a continuous charge of air is fed through a damping reservoir and tuned pipe to the intake manifold for the cylinders. See Paper 790069 presented at the Congress and Exposition, Detroit, Michigan, February, 1979 by M. C. Brands and entitled "Helmholtz Tuned Induction System For Turbocharged Diesel Engine".

DISCLOSURE OF THE INVENTION

The benefits of an increased boost to a four cycle internal combustion engine can be obtained without relying on turbocharging.

A crankcase supercharged four cycle engine includes an outside air inlet port positioned so that upon each expansion stroke of the piston a discrete pulsed charge of pressurized air is fed to the crankcase, and hence from the crankcase through a one-way valve into a surge tank. The surge tank chamber is connected through a tuning pipe to a manifold volume chamber leading to the air intake of the engine cylinder. The tuning pipe is designed with the correct length and volume to provide a resonant frequency which increases engine torque at low speed.

The construction provides a closed loop connection between the crankcase and engine cylinder which is subjected to air pressure pulses which are directly responsive to the frequency of reciprocation of the piston. A pressure multiplier effect is obtained within the loop to substantially increase the pressure of air ultimately fed to the cylinder.

BRIEF DESCRIPTION OF THE DRAWINGS

FIG. 1 is a schematic sectional view of a four cycle engine at the time of ignition;

FIG. 2 is a view of the engine showing the expansion stroke of the piston after ignition;

FIG. 3 is a view of the engine with the piston approaching the end of the exhaust stroke;

BEST MODE FOR CARRYING OUT THE INVENTION

Figure 4:
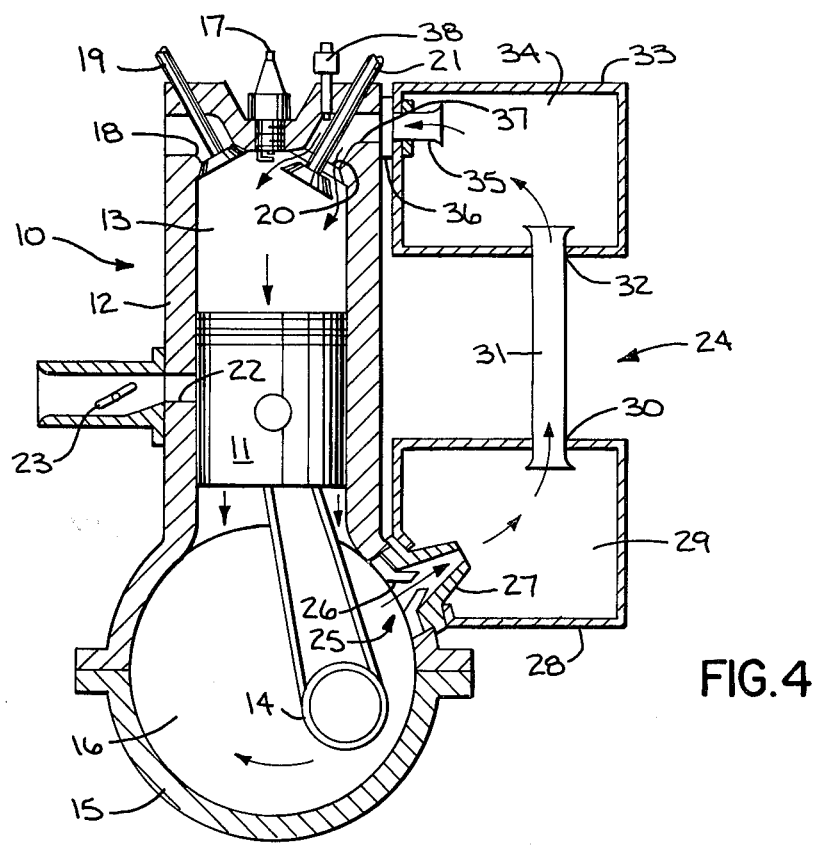
FIG. 4 is a view of the engine showing the next, or fuel intake, stroke.

A four cycle internal combustion engine 10 has at least one piston 11 contained within a cylinder 12 which forms a cylinder chamber 13. Piston 11 is reciprocably driven in the usual manner from a crankshaft 14 disposed in the engine crankcase 15, with the latter forming a crank chamber 16.

As shown, engine 10 is of the gasoline spark ignited type and its cylinder 12 includes a spark plug 17 mounted therein, an exhaust port 18 and associated valve 19, together with an inlet port 20 and associated valve 21.

For purposes of supercharging crankcase 15, a piston controlled air induction port 22 is disposed in the wall of cylinder 12 closely adjacent the bottom of piston 11 when the latter is in its extended position. Port 22 is adapted to communicate with crankcase chamber 16 when piston 11 is extended, but is blocked in other piston positions. Furthermore, port 22 communicates with the atmosphere via a butterfly throttle valve 23.

It is desired to increase the power of engine 10 at low speeds without having to rely on a turbocharger to do so.

For this purpose, crankcase chamber 16 is connected through a closed loop 24 to cylinder 12. As shown, loop 24 includes an air outlet 25 in crankcase 15 which communicates through an air pump comprising a one-way valve 26 having a nozzle 27. One-way valve 26 is shown as a reed valve at the throat of nozzle 27 which permits only discharge of air from crankcase 15. Nozzle 27 discharges into a surge tank 28 which acts as a damping reservoir and which forms an enlarged chamber 29. Surge tank 28 is provided with an outlet 30 to which is mounted one end of a tuning pipe 31 having flared ends and a resonant frequency such as that described in the above-identified Brands Paper No. 790069, the details of which are incorporated herein by reference. The other end of tuning pipe 31 is mounted to the inlet 32 of a manifold 33 or the like which provides an enlarged volume chamber 34. The discharge portion of manifold 34 connects through a short pipe 35 and a fitting 36 to a duct 37 in cylinder 12 which in turn leads to inlet port 20 for cylinder chamber 13.

A suitable gasoline injector 38 is connector to duct 37 to provide measured quantities of fuel to engine 10.

OPERATION

Referring to FIG. 1, which illustrates engine 10 at the time of ignition, piston 11 is in its extended position at the end of an upward stroke and air induction port 22 is open to connect crankcase chamber 16 with the atmosphere. Valves 19 and 21 are closed.

Upon ignition, piston 11 is forced downwardly, blocking off port 22 and forcing a discrete charge of air into crankcase 15. See FIG. 2. The air, being under compression, is forced into closed loop 24 through crankcase air outlet 25 and one-way valve 26 and hence through nozzle 27 into surge tank 28. The charge of compressed air will also fill tuning pipe 31 and manifold 33.

Immediately upon commencement of return of piston 11 in its exhaust stroke, one-way valve 26 closes to trap the charge of air in loop 24, and with exhaust valve 19 open, the piston moves upwardly as shown in FIG. 3, and ultimately assumes its uppermost position with air induction port 22 again connecting crankcase chamber 16 to atmosphere.

During the next downward stroke of piston 11, a second discrete charge of air is again forced into crankcase 15 and then injected into the pressurized loop 24. In this instance, however, fuel is substantially simultaneously injected by injector 38 into duct 37 and inlet valve 20 is open. See FIG. 4. The second charge of air discharging from nozzle 27 provides a pressure multiplier effect, and the highly pressurized air flows through the tuned loop 24 and hence into cylinder chamber 13.

Figure 5:
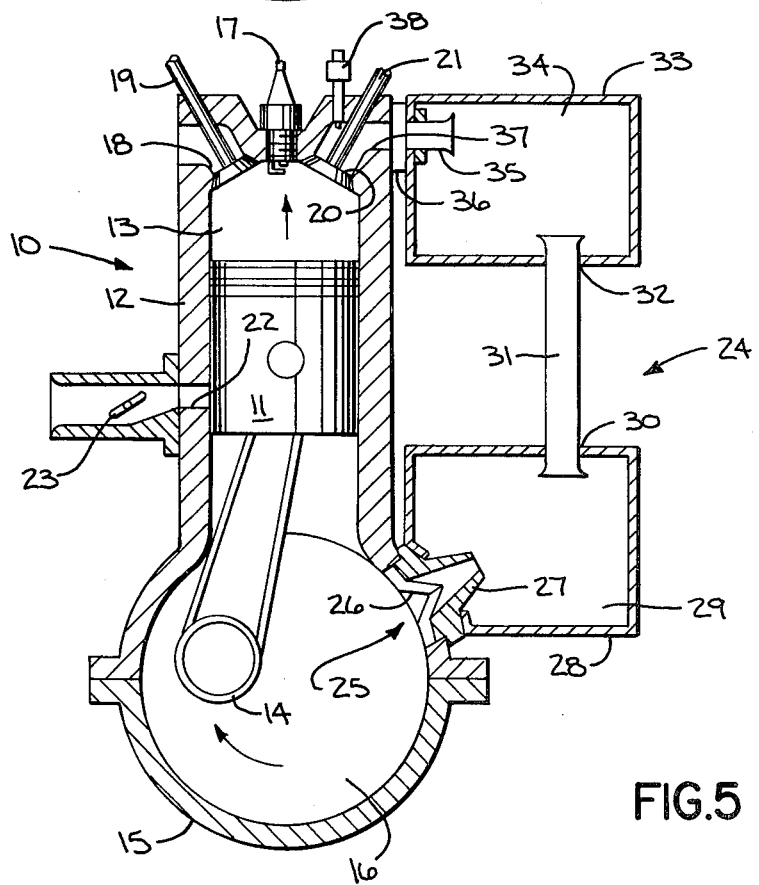
FIG. 5 is a view of the engine showing the compression stroke just prior to ignition.

Once piston 11 reaches the end of its second expansion stroke and loop 24 is essentially emptied of its dual charge of compressed air, the piston then enters into its compression stroke, as shown in FIG. 5, with valves 19, 21 and 26 all closed and air induction port 22 blocked. The system is then again ready for ignition, as in FIG. 1.

Continuity operation of the engine provides a plurality of successive pressure pulses to loop 24, the frequency of the pulses being directly related to the frequency of piston reciprocation and thus directly related to the engine crankshaft R.P.M. Alternate successive charges are first trapped and then, together with a second charge, released into cylinder 12.

Certain modifications to the described structure may be made without changing the basic operation of the inlet tuning concept. For example, gas injector 38 could be replaced with a carburetor of any suitable design. In addition, air induction port 22 could be positioned in the wall of crankcase 15 instead of in cylinder 12, with piston controlled inlet valve means replaced by a one-way reed valve or crankshaft rotary valve. If the engine is of the diesel type, spark plug 17 could be replaced with a diesel injector.

I claim:

1. In a supercharged four cycle internal combustion engine having a crankcase, a crankshaft, a piston reciprocable in a cylinder, a device for supplying fuel to said cylinder, and valved air inlet and exhaust ports in said cylinder, a cylinder air charging device comprising:
    (a) an air induction port disposed in the wall of said engine and with said air induction port providing communication between said crankcase and the atmosphere when said piston is at a position at the end of its upward stroke,
    (b) and a tuned closed loop connecting said crankcase with said engine cylinder and providing an air passage therebetween, said closed loop including:
        (1) an air outlet port disposed in said crankcase for receiving a discrete charge of compressed air therethrough in response to each downward stroke of said piston,
        (2) means forming a pair of enlarged chambers with a first chamber communicating with said crankcase air outlet port and a second chamber independent of said fuel supply device and communicating with said cylinder inlet,
        (3) and an unrestricted tuning pipe disposed between and joining said chambers,
    (c) said loop forming tuned means receiving successive pressure pulses of compressed air from said crankcase in response to piston reciprocation for subsequent transfer to said cylinder.

2. The cylinder air charging device of claim 1 in which the frequency of said successive pressure pulses is directly related to the R.P.M. of said engine crankshaft.

3. The cylinder air charging device of claim 1 which includes means responsive to alternate downward reciprocations of said piston to trap said discrete charge of compressed air within said tuned loop.

4. The cylinder air charging device of claim 1 which includes means responsive to successive downward reciprocations of said piston to first trap a first discrete charge of compressed air within said tuned loop, and to then inject a second discrete charge of compressed air into said trapped air to thereby multiply the air charges within said loop for subsequent release into said cylinder.

* * * * *